Oct. 29, 1940. E. R. EVENSON 2,219,983
FISHING TACKLE
Filed June 7, 1939
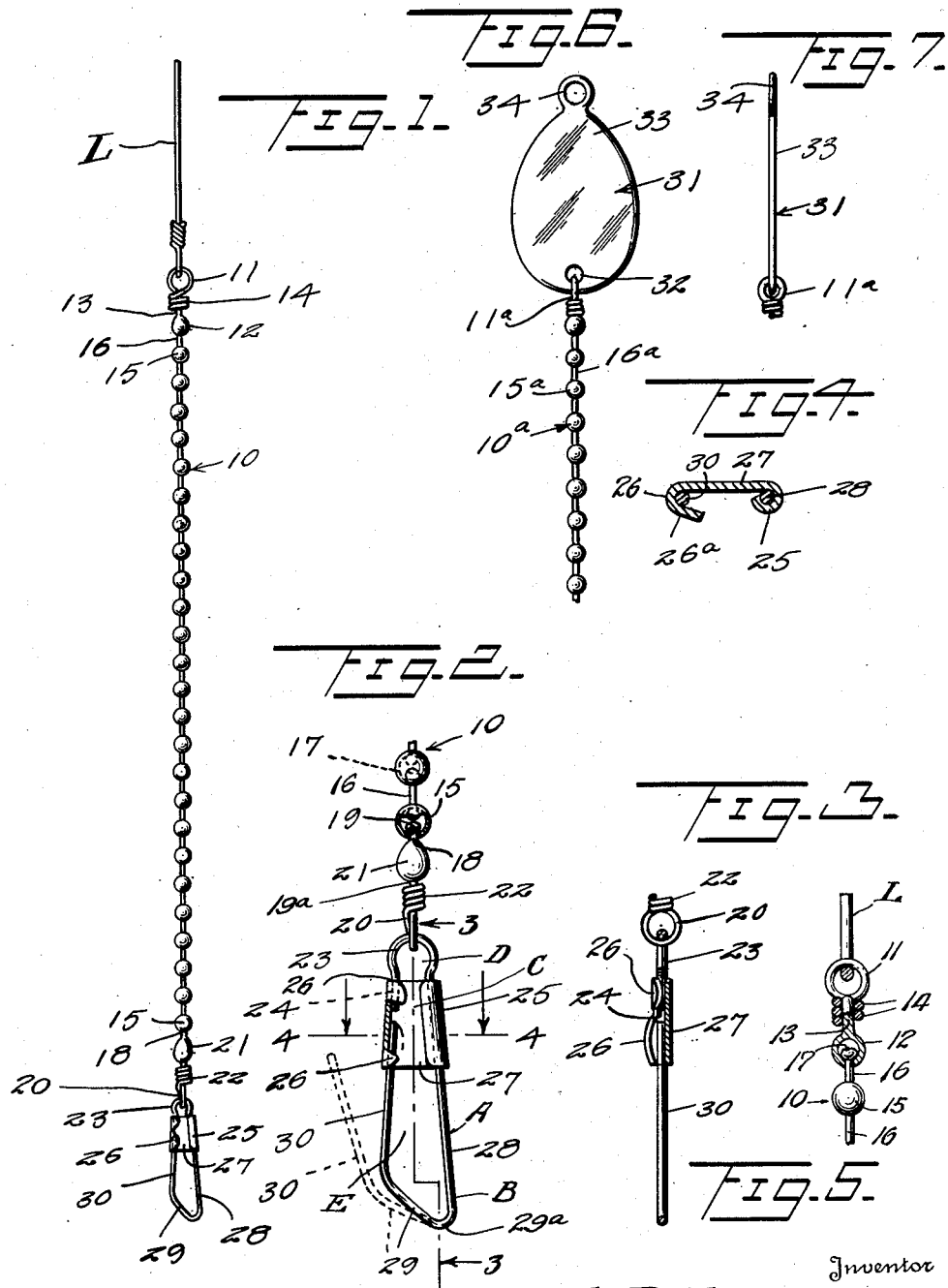
Inventor
E. R. Evenson
By Kimmel & Crowell
Attorneys Patented Oct. 29, 1940

2,219,983

UNITED STATES PATENT OFFICE 2,219,983

FISHING TACKLE

Edwin Robert Evenson, Fargo, N. Dak.

Application June 7, 1939, Serial No. 277,926

3 Claims. (Cl. 43—28)

This invention relates to fishing tackle and more particularly to an improved trolling and casting leader for a fish line.

An object of this invention is to provide an improved leader which is constructed of a plurality of swivelly connected elements so that one portion of the leader may freely rotate relative to another portion.

Another object of this invention is to provide a leader of this character which is so constructed that it will not snag or kink.

A further object of this invention is to provide a leader which is of a non-kinkable character and which is so constructed that it will attract the fish due to the light reflecting surfaces.

A further object of this invention is to provide a leader consisting of a plurality of swivelly connecting elements and a blade or fin at the inner end of the leader and to which the line is adapted to be connected, the blade or fin acting to prevent twisting of the line in either direction.

To the above objects and to others which may hereinafter appear, the invention consists of the novel construction, combination and arrangement of parts as will be more specifically referred to and illustrated in the accompanying drawing, but it is to be understood that changes, variations and modifications may be resorted to which fall within the scope of the invention as claimed.

In the drawing:

Figure 1 is a detail side elevation of a leader constructed according to an embodiment of this invention, Figure 2 is an enlarged fragmentary side elevation, partly broken away and in section of the lower end of the leader, Figure 3 is a sectional view taken on the line 3—3 of Figure 2, Figure 4 is a sectional view taken on the line 4—4 of Figure 2, Figure 5 is a sectional detail upon an enlarged scale, Figure 6 is a fragmentary detail side elevation of a modified form of leader structure, and Figure 7 is a fragmentary edge view of the upper portion of the leader shown in Figure 6.

Referring to the drawing, the character L designates generally a fish line and the numeral 10 designates generally a leader secured to an end of the line L. In the present instance, the leader 10 is provided with a loop or eye 11 at its upper or inner end and the loop 11 has a socket member 12 secured thereto, the socket member being provided with a stem 13 about which convolutions 14 of the loop 11 engage. The stem 13 is adapted to be soldered or otherwise fastened within the convolutions 14. The leader 10 includes a series of spaced hollow spherical members or balls 15 connected together by spaced short bars or links 16. The rear or upper bar 16 is connected to the socket member 12. Each member 15 connects a pair of bars 16 together in alignment The bars 16 are adapted to rotate in the members 15 and whereby when the bars 16 are connected together by the members 15, a weighted leader structure will be provided wherein the connecting links are axially rotatable one relative to the other and these links are adapted to have a limited universal movement one relative to the other. The bars 16 provide the leader with what may be termed a sectional stem.

Extending into the forward or lowermost member 15 is the stem 18 of a lower or forward socket member 21. The stem 18 is formed with a head 19 which engages the inner face of that member 15 into which said stem extends. Depending from or extending forwardly from member 21, as well as having one end secured to the latter, is a wire element bent upon itself in a manner to form a stem 19ª, a loop or eye 20, and a series of coils 22 surrounding stem 19ª for closing the loop or eye and acting to prevent the spreading apart of that portion of the wire which provides the loop 20.

The appliance includes a lure attaching means generally indicated at A and it is formed of a split skeleton section B and a plate-like section C connected to and disposed transversely of the section B, intermediate the ends of the latter to provide the lure attaching means A with a permanently closed loop D and a normally closed loop E. The loop D is disposed at the rear or inner end of the attaching means A. The loop E is disposed at the forward or rear portion of the attaching means A.

The section B is formed from a single length of wire bent upon itself to provide a substantially yoke-shaped inner or rear portion 23, a sectional side portion formed of a rear or inner part 24 and an outer or forward part 30 having its rear end normally disposed in endwise aligned spaced relation with the forward end of the part 24, a side portion 28 of greater length than the said sectional side portion, an inclined outer or forward end portion 29, and a rounded outer or forward corner portion 29ª. The inner or rear portion 23 merges into the inner ends of the said side portions. The outer end of the sectional side portion merges into one end of the end portion 29, the latter at its other end merges into one end of the corner portion 29ª. The outer end of side portion 28 merges into the other end of the corner portion 29. The end portion 29 extends inwardly at a forward inclination from part 30 to the corner portion 29ª. The said side portions are disposed in oppositely outwardly divergent relation with respect to each other. The part 30 of the sectional side portion is of materially greater length than the part 24 and it is resilient.

The section C consists of a tapered plate 27 formed with inturned, oppositely disposed flanges 25, 26 throughout the sides of said plate and said flanges coact with one face of the body of the plate to provide side channels. The plate 27 is disposed on section B at a point substantially between the transverse median and inner or rear end of such section. The side portion 28 of section B extends through the channel provided by the flange 25 and is suitably secured by welding or otherwise to plate 27 and flange 25. The part 24 of the sectional side portion of section B extends into the inner or rear portion of the channel provided by the flange 26 and it is suitably secured by welding or otherwise to flange 26 and plate 27. The outer or forward part 26ª of flange 26 is offset with respect to the remaining portion of such flange for the purpose of increasing the dimensions of the outer portion of the channel formed by plate 26, and such offset portion 26ª constitutes a keeper for a purpose to be referred to. The part 30 of the sectional side portion of section B constitutes a latching member and is engageable in the portion of largest dimension of the channel provided by the flange 26 for coaction with the offset portion 26ª of flange 26 to normally maintain the loop E normally closed. The lure is adapted to be connected to the loop E of the attaching means A.

The rear end of the plate 27 correlates with the rear portion 23 of section B to form the loop D. The latter is permanently closed. The forward end of the plate 27 and flange portion 26ª coacts with the portions 28, 29, 29ª and 30 of the section B to form the loop E. The latter is normally closed due to the coaction of the said part 30 and the offset portion 26ª of flange 26.

The balls or spherical members 15 are constructed of metal and the outer surface of each ball 15 is plated or coated with a light reflecting plating which will not readily corrode in either fresh or salt water. Due to the fact that the leader from end to end is constructed of metal, this leader will act as a sinker, making it unnecessary to add a sinker on the line L.

Due to the fact that the component parts of the leader 10 are freely rotatable one relative to the other, any rotation of the lure or bait secured to the loop E of the attaching means A, will not subject the line L to any twisting action. This as above stated is because the bars 16 are provided with heads 17 at each end which engage in the hollow balls 15. There is a limited universal swinging movement between the several connecting links 16 with an unlimited rotary movement permissible as between two or more of the connecting links 16. Furthermore, by constructing the leader out of light reflecting material, the leader will act as an attraction to the fish.

In Figures 7 and 8, there is disclosed a modified form of leader structure wherein a flexible leader member 10a is disclosed which is similar in every detail to the flexible member 10, being formed of spherical hollow members 15ª and double-headed links 16ª. The lower or outer end of the flexible member 10ª is adapted to have connected thereto a lure or bait attaching member similar to that shown in Figures 2 and 3. The upper or inner end of the leader 10ª has secured thereto a blade or fin 31 which in side elevation is substantially egg-shaped and is provided at its outer portion with an opening 32 through which an attaching loop or wire 11ª similar to the ring or wire 11 engages. The upper or smaller end 33 of the blade or fin 31 is provided with a ring or wire 34 which may be formed integrally with the blade 31. This ring or wire 34 is adapted to receive the outer end of a fish line.

With a structure as shown in Figures 7 and 8, the blade or fin 31 is adapted to prevent twisting of the fish line in either direction. It will be understood that the leader 10ª is formed of a plurality of swivelly connected rings in the form of hollow balls and double-headed bars which in themselves will act to permit rotation of the lure or other means secured to the attaching member. The blade or fin 31 being disposed lengthwise of the flexible member 10ª and projecting laterally of the longitudinal axis thereof provides a drag in a lateral direction which will act to prevent axial rotation of the line and thus prevent twisting or untwisting of the line. The blade 31 is also provided on opposite faces thereof with bright surfaces so that this blade will coact with the bright surfaces of the members 15ª and 16ª in attracting a fish to the leader and the lure. The blade or fin 31 is preferably constructed of metal so that this member will also act as a weight for the fish line.

What I claim is:

1. In a fishing appliance an attaching means formed of a skeleton-like section and a plate-like section disposed transversely of and secured to said skeleton section intermediate the ends of the latter, said sections having correlated parts forming a permanently closed rear loop for connecting a leader to said means, and said sections having other correlated parts forming a normally closed forward loop for connecting a lure to said means.

2. In a fishing appliance an attaching means formed of a skeleton-like section and a plate-like section disposed transversely of and secured to said skeleton section intermediate the ends of the latter, said sections having correlated parts forming a permanently closed rear loop for connecting a leader to said means, and said sections having other correlated parts forming a normally closed forward loop for connecting a lure to said means, one of the correlated parts of the plate-like section employed in forming the outer loop constituting a keeper and one of the correlated parts of said skeleton-like section employed in forming the outer loop constituting a resilient latching member for correlation with the keeper to normally close the outer loop.

3. In a fishing appliance an attaching means formed of a skeleton-like section and a plate-like section disposed transversely of and secured to said skeleton-like section intermediate the ends of the latter, said sections having correlated parts forming a permanently closed rear loop, said sections having other correlated parts forming a normally closed forward loop for connecting a lure to said means, said loops being disposed in spaced relation, a rear socket forming element, means extending rearwardly from said element for connection with a fishing line, a forward socket forming element, means extending forwardly from said forward element for connecting it to said rear loop, a series of spaced hollow spherical members, the forward end one of said series of members being revolubly connected to said forward element, and a series of spaced short bars interposed between and rotatably connected to and coupling said members together in spaced relation, and the inner end one of said series of bars being rotatably connected to said rear socket element.

EDWIN ROBERT EVENSON.